United States Patent [19]

Mon

[11] Patent Number: 4,691,187
[45] Date of Patent: Sep. 1, 1987

[54] VARIABLE LINEAR RESISTOR
[75] Inventor: George Mon, Silver Spring, Md.
[73] Assignee: The United States of America as represented by the Secretary of the Army, Washington, D.C.
[21] Appl. No.: 647,591
[22] Filed: Sep. 6, 1984
[51] Int. Cl.$^4$ .......................................... H01C 10/10
[52] U.S. Cl. ..................... 338/114; 338/80; 338/222; 338/231
[58] Field of Search ............. 338/112, 114, 94, 99, 338/80, 222; 338/231

[56] References Cited
U.S. PATENT DOCUMENTS

| | | | |
|---|---|---|---|
| 2,806,115 | 9/1957 | Stuetzer | 338/114 X |
| 3,304,528 | 2/1967 | Rastrelli et al. | 338/114 X |
| 4,114,134 | 9/1978 | Kley | 338/114 X |
| 4,163,204 | 7/1979 | Sado et al. | 338/114 |

OTHER PUBLICATIONS

"The Design of a Fluoric Linear Resistor"; Mon, George; Harry Diamond Laboratories, Adelphi, Md.; Jun. 1975.

Primary Examiner—E. A. Goldberg
Assistant Examiner—M. M. Lateef
Attorney, Agent, or Firm—Saul Elbaum; Alan J. Kennedy; Thomas E. McDonald

[57] ABSTRACT

The invention comprises a variable linear resistor. It comprises a first plate having a recessed area cut into one face and a second plate parallel to and facing the face of the first plate with the recessed area. A length of elastic tubing is disposed in the recessed area. The distance between the two plates is adjustable, and this allows for the compression of the elastic tube.

2 Claims, 6 Drawing Figures

VARIABLE LINEAR RESISTOR

RIGHTS OF THE GOVERNMENT

The invention described herein may be manufactured, used or licensed by or for the government of the United States of America for governmental purposes without payment to me of any royalties thereon.

BACKGROUND OF THE INVENTION

There exists a requirement in many fluidic systems for variable linear resistors. For example, variable linear resistors are needed to set the scale factor in linear scaler. Many ways exist to vary flow resistance. The most common one is the use of a needle valve. However, the resistance of a needle valve is nonlinear, and this limits its usefulness in fluidic control systems.

One attempt to design a variable linear resistor is described in "The Design of a Flueric Linear Resistor," by George Mon, United States Army, Harry Diamond Laboratories report #HDL-R-RCA-76-6, published June, 1975. In it the principle of a fully developed flow through a rectangular channel is used in which the flow resistance is linearly related to the pressure drop (in the design of a linear resistor). The resistor is made up of a number of discrete resistor laminates. By stacking these rectangular channel laminates in parallel, the resistance of the resistor can be changed. However, this design does not have a continuous variation of the resistance, due to the fact that the resistor is constructed out of discrete resistor laminates. As a result, it is very difficult to design a resistor to have an exact value and its value cannot be changed while in use.

The variable linear resistor of the present invention is presented to overcome the shortcomings of the needle valve and the laminate type resistor. The variable linear resistor of the present invention has a linear relationship between the flow rate and the pressure drop and its value can be precisely set in a manner similar to that of a needle valve.

SUMMARY OF THE INVENTION

A variable linear resistor is provided. The resistor comprises a first plate having a recessed area cut into one face, and a second plate parallel to and facing the face of the first plate with the recessed area. A length of elastic tubing is disposed in the recessed area. Means for adjusting the distance between the two plates, which can be an adjustment screw, are provided. Means for allowing fluid to flow through the elastic tubing are also provided.

OBJECTS OF THE INVENTION

It is an object of this invention to present a variable linear resistor which has a linear relationship between the flow rate and the pressure drop.

It is another object of this invention to present a variable linear resistor which can be precisely set to an exact value of resistance.

Lastly, it is an object of this invention to present a variable linear resistor whose value can be changed during use.

DESCRIPTION OF THE PREFERRED EMBODIMENT

Figure 1:
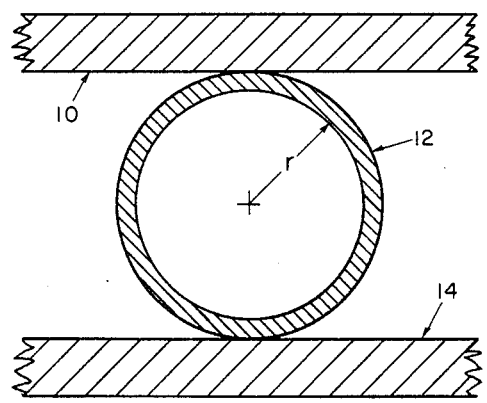
FIG. 1 illustrates a circular cross-section of elastic tubing placed between two plates.

FIG. 1 illustrates a cross section of a flexible capillary tube 12 placed between plates 10 and 14. When a fully developed laminer flow is flowing in the capillary tube, the flow rate is linearly related to the pressure drop. For a capillary tube with a radius of r, the pressure drop, $\Delta p$, is given by $$p = \frac{8\mu L Q}{r^4} \tag{1}$$

where
 L=the length of the capillary tube,
 Q=the flow rate, and
 $\mu$=the absolute viscosity.

Figure 2:
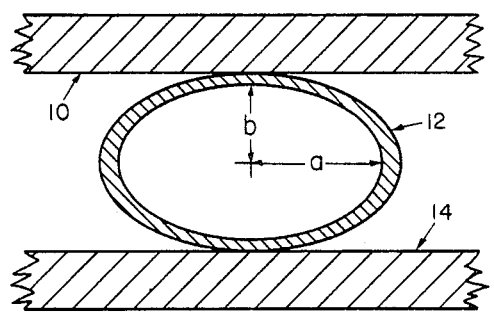
FIG. 2 illustrates an elliptical cross-section of elastic tubing placed between two plates.

If capillary tube 12 is squeezed as shown in FIG. 2, the circular cross-sectional area shown in FIG. 1 will change to an elliptical shape. For a capillary tube with an elliptical cross-sectional area, the pressure drop can be written as $$p = \frac{4\mu L(a^2 + b^2)Q}{a^3 b^3} \tag{2}$$

where a and b are the lengths of the major and minor radii, respectively. When a=b, equation (2) reduces exactly to equation (1). For a given perimeter, a tube with a circular cross-sectional area has the largest area. For a given radius, r, the perimeter of a circle, $P_c$ can be written as $$P_c = 2\pi r. \tag{3}$$

and the perimeter of an ellipse can be written as $$P_e = \pi(a + b)\left(1 + \frac{R^2}{4} + \frac{R^4}{64} + \frac{R^6}{256} + \ldots\right) \tag{4}$$

where $$R = \frac{(a - b)}{(a + b)}. \tag{5}$$

Equation (4) can be approximated by $$P_e \simeq \pi(a + b)\left(\frac{64 - 3R^4}{64 - 16R^2}\right) \tag{6}$$

For a given capillary tube the relationship between a and b can be solved by equating $P_c$ to $P_e$, or $$2\pi r = \pi(a + b)\left(\frac{64 - 3R^4}{64 - 16R^2}\right) \quad (7)$$

Once the relationship between a and b is known, the resistance of the elliptical capillary can then be calculated by using the following equation $$Z_e = \frac{4\mu L(a^2 + b^2)}{\pi a^3 b^3} \quad (8)$$

Figure 3:
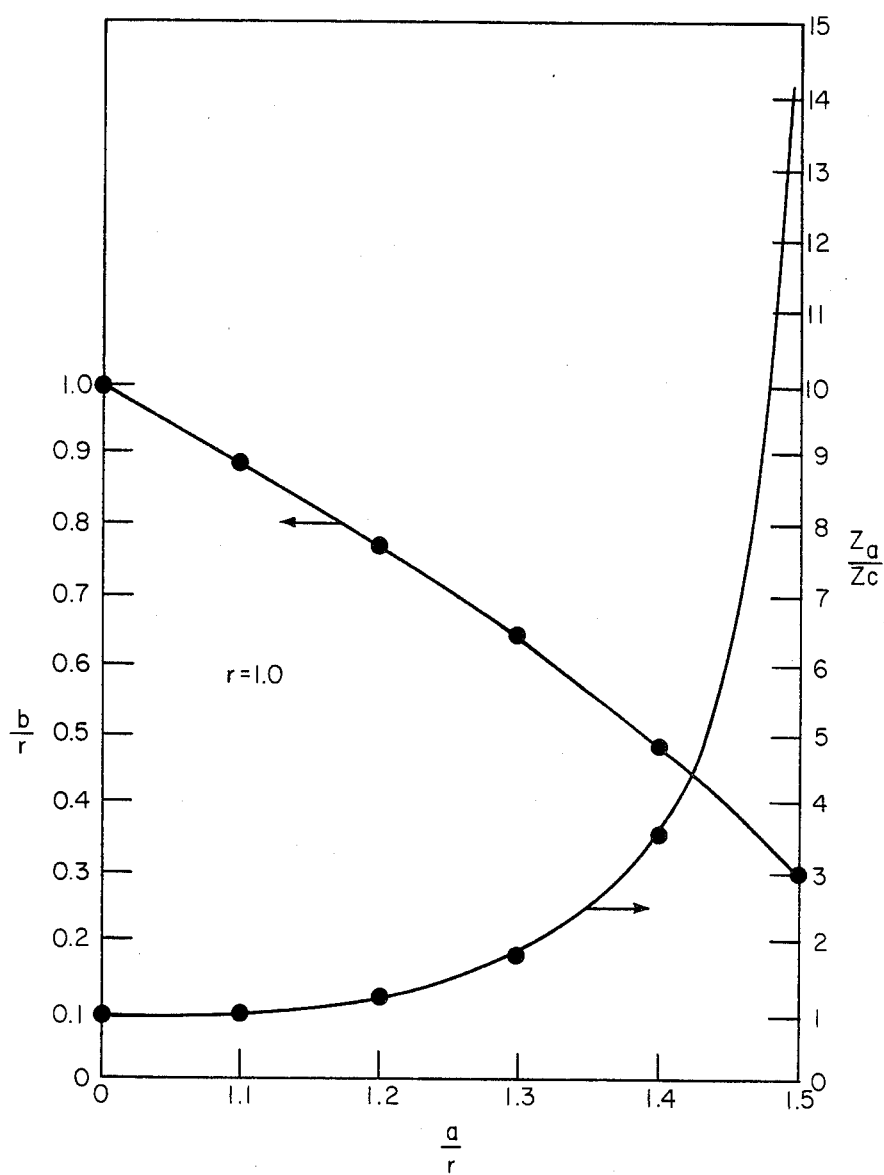
FIG. 3 illustrates the relationship between the minor radius of the elliptical tubing and the flow resistance.

FIG. 3 shows the typical plot of b/r and the normalized resistance, Ze/Zc, as a function of a/r, where Zc is the resistance a a circular capillary tube. The term Zc can be written as $$Zc = \frac{8\mu L}{\pi r^4}$$

From FIG. 3 it can be seen that as the minor radius of the elliptical tube is decreased, the flow resistance is increased. This is the basic principle used in the design of variable linear resistor.

Figure 4:
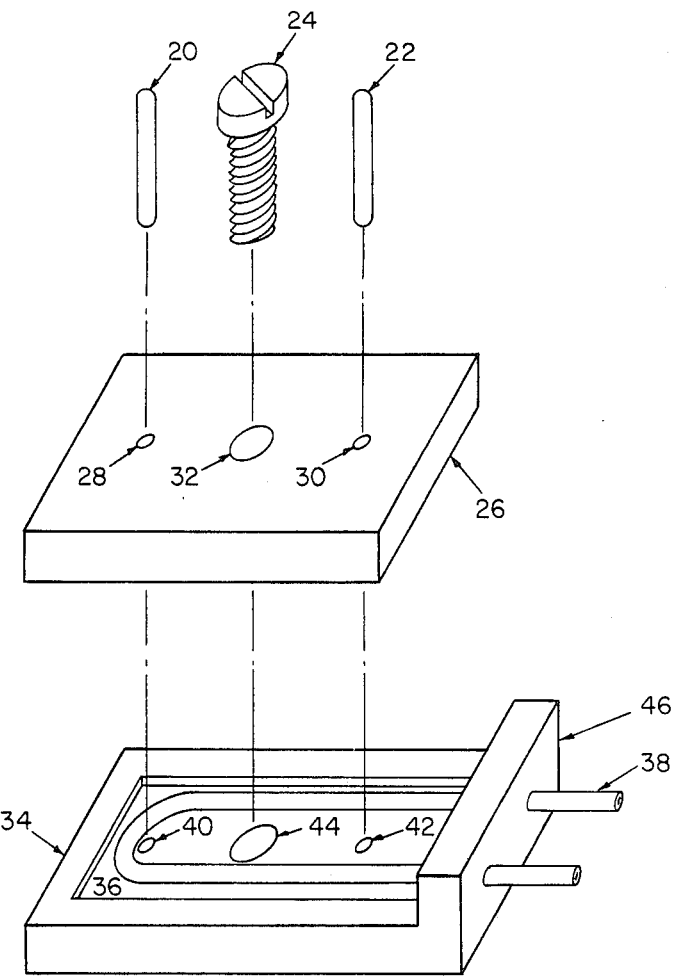
FIG. 4 illustrates the schematic of the variable linear resistor.
Figure 5:
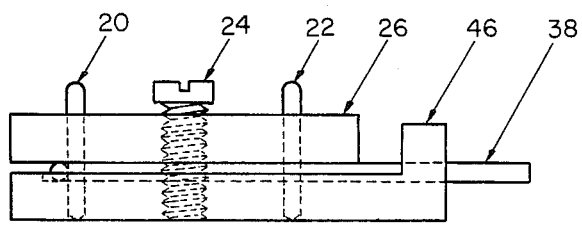
FIG. 5 shows a side view of the variable linear resistor.

FIG. 4 shows a sectional view of the preferred embodiment of the present invention. It comprises a top plate 26, a bottom plate 34, two dowel pins 20 and 22, an adjustment screw 24, and a length of elastic capillary tubing 38. The dowel pins 22 and 24 align the two plates through holes 28 and 40 for pin 20 and holes 30 and 42 for pin 22. Plate 34 has a recessed area 36 cut into it, and elastic capillary tube 38 is placed in it. Plate 34 has the recessed area 36 cut into it so that elastic capillary tube 38 is not totally pinched off. Screw 24 passes through holes 32 and 44 and is used to adjust the compression of elastic capillary tube 38. As the adjustment screw is tightened, the cross-section of the capillary tube is changed from a circular to an elliptical shape. As a result, the flow resistance is increased. The depth of recessed area 36 in plate 34 is dependent on the size of the capillary tubing and the desired range of resistance. Means, not illustrated, for allowing fluid to flow through the elastic capillary tube 38, are also included in the preferred embodiment of the invention. This means can include any source of fluid.

Figure 6:
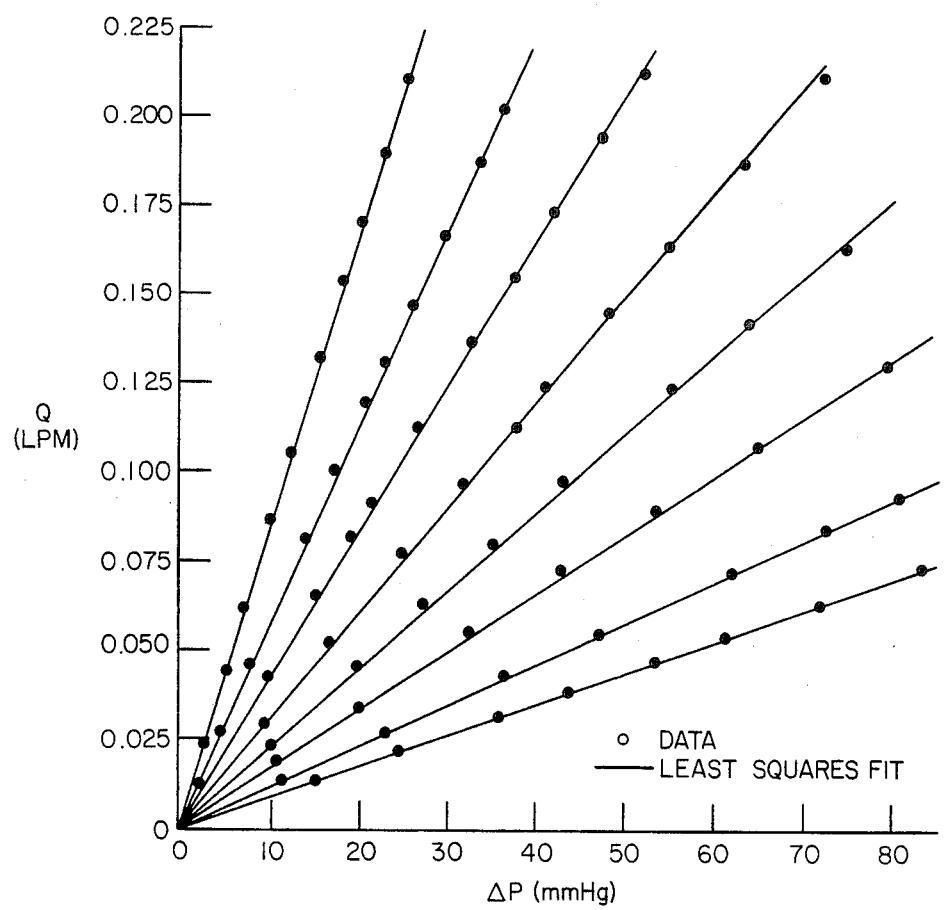
FIG. 6 shows a typical plot of the pressure-flow, p-Q, characteristics of the variable linear resistor at various adjustment screw settings.

FIG. 6 shows a typical plot of the pressure-flow, p-Q, characteristics of the variable linear resistor at various adjustment screw settings. In this figure, it can be seen that the p-Q characteristics are linear and the slopes of the p-Q characteristics can be varied by adjusting the adjustment screw. The results clearly show that the present invention is a variable linear resistor, and that the resistance of the linear resistor can be set precisely while measurements are being made.

While the invention has been described to make reference to the accompanying drawings, I do not wish to be limited to the details shown therein as obvious modifications may be made by one of ordinary skill in the art.

I claim:
1. A variable linear resistor comprising:
   a. a first plate having a recessed area cut into one face;
   b. a second plate parallel to and facing the face of said first plate with the recessed area;
   c. a length of elastic tubing disposed in said recessed area;
   d. means for adjusting the distance between said first and second plates; and
   e. means for allowing fluid to flow through said elastic tubing.
2. The device of claim 1 wherein said means for adjusting the distance between said first and second plates comprises an adjustment screw.

* * * * *